(12) United States Patent
Oishi et al.

(10) Patent No.: US 7,690,466 B2
(45) Date of Patent: Apr. 6, 2010

(54) MOTORCYCLE

(75) Inventors: Akifumi Oishi, Shizuoka (JP); Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 189 days.

(21) Appl. No.: 11/946,713

(22) Filed: Nov. 28, 2007

(65) Prior Publication Data
US 2008/0121454 A1      May 29, 2008

(30) Foreign Application Priority Data
Nov. 29, 2006    (JP)    ............... 2006-322066
Jan. 26, 2007    (JP)    ............... 2007-016496

(51) Int. Cl.
*B62M 7/00*       (2006.01)
(52) U.S. Cl. ..................................... 180/230
(58) Field of Classification Search ................ 180/219, 180/230, 69.1
See application file for complete search history.

(56) References Cited
U.S. PATENT DOCUMENTS

| 5,439,585 | A | 8/1995 | Arakawa | |
|---|---|---|---|---|
| 6,257,178 | B1 * | 7/2001 | Laimbock | ........... 123/54.1 |
| 2005/0107194 | A1 | 5/2005 | Oishi et al. | |
| 2007/0007065 | A1* | 1/2007 | Iizuka et al. | ........... 180/227 |

FOREIGN PATENT DOCUMENTS

| EP | 0610617 A1 | 8/1994 |
|---|---|---|
| EP | 1498592 A1 | 1/2005 |
| JP | 59009365 A | 1/1984 |
| JP | 61-040864 | 9/1986 |
| JP | 09250320 A | 9/1997 |

OTHER PUBLICATIONS

European Search Report for corresponding European application 07254512.2 lists the references above.

* cited by examiner

*Primary Examiner*—Lesley Morris
*Assistant Examiner*—Levon Fiore
(74) *Attorney, Agent, or Firm*—Keating & Bennett, LLP

(57) ABSTRACT

A motorcycle having a belt type CVT and an engine unit in which an axial length of a cylinder is restricted. A body frame comprises a down frame extending vertically. The engine unit comprises a four-stroke engine, a belt type CVT, a clutch and a crank case. A cylinder is arranged rearwardly of the down frame with an axis thereof extending vertically. The clutch is provided between a secondary sheave shaft and an output shaft. The crank case is formed with an oil reservoir portion below a crank shaft to store lubricating oil. A rear end of the oil reservoir portion is rearward of a front end of a secondary sheave. An axis of the crank shaft is below an axis of the secondary sheave shaft.

5 Claims, 5 Drawing Sheets

MOTORCYCLE

RELATED APPLICATIONS

This application claims the benefit of priority under 35 USC 119 of Japanese patent application no. 2006-322066, filed on Nov. 29, 2006, and Japanese patent application no. 2007-016496, filed on Jan. 26, 2007, which applications are hereby incorporated by reference in their entireties.

BACKGROUND OF THE INVENTION

1. Field of the Invention

The present invention relates to a motorcycle having a four-stroke engine and a belt type continuously variable transmission.

2. Description of Related Art

JP-B-61-040864 discloses a motorcycle having an engine unit that comprises a two-stroke engine arranged rearwardly of a down frame extending vertically with an axis of a cylinder extending vertically. A belt type continuously variable transmission ("CVT") is arranged in a crank case, which supports a crank shaft and an output shaft. The output shaft of the engine unit is connected to a rear wheel through a power transmission mechanism such as belt, chain or drive shaft to transmit motive power to the rear wheel.

The motorcycle of JP-B-61-040864 assumes the same configuration as that of an ordinary motorcycle but does not need a gearshift and is therefore high in convenience. Replacement of the two stroke engine of JP-B-61-040864 with a four-stroke engine, which has a relatively large torque in low speed, would further improve convenience. However, replacement of the two-stroke engine of JP-B-61-040864 with a four-stroke engine is problematic.

In a four-stroke engine, intake valves, exhaust valves and a valve operating mechanism for driving the intake and exhaust valves must be arranged on a cylinder head. Also, an oil reservoir portion must be formed below the crank shaft to store lubricating oil. Therefore, a four-stroke engine is relatively long in an axial direction of a cylinder relative to a two-stroke engine. In trying to apply such four-stroke engine to a motorcycle, in which the engine is arranged rearwardly of a down frame extending vertically with axes of cylinders extending vertically, the motorcycle cannot but be increased in total height, or decreased in minimum ground level, since the engine is long in an axial direction of the cylinders. Accordingly, it is difficult from a compatibility standpoint to simply replace the two-stroke engine of the motorcycle of JP-B-61-040864 with a four-stroke engine.

SUMMARY OF THE INVENTION

The invention addresses these problems and provides a motorcycle having an engine unit comprising a four-stroke engine and a belt type CVT and having a restricted length in an axial direction of a cylinder.

A motorcycle according to the invention comprises an engine unit having a power transmission mechanism that transmits motive power to a drive wheel from an output shaft. The motorcycle has a body frame with a down frame extending vertically. A four-stroke engine includes a cylinder body forming a cylinder and a crank shaft. The cylinder is arranged rearwardly of the down frame with an axis thereof extending vertically. The crank shaft is arranged below the cylinder. A continuously variable transmission includes a primary sheave, a secondary sheave shaft, a secondary sheave and an endless belt. The primary sheave is provided on the crank shaft. The secondary sheave shaft is arranged rearwardly of the crank shaft and is connected to the output shaft. The secondary sheave is provided on the secondary sheave shaft. The endless belt is wound round the primary and secondary sheaves. A clutch is provided between the secondary sheave shaft and the output shaft. An engine case supports the crank shaft, the secondary sheave shaft and the output shaft. The engine case is formed with an oil reservoir portion disposed below the crank shaft to store lubricating oil. The oil reservoir portion is formed with a rear end thereof positioned rearwardly of a front end of the secondary sheave. The crank shaft is arranged with an axis thereof positioned below an axis of the secondary sheave shaft.

According to the invention, a motorcycle is realized with an engine unit comprising a four-stroke engine and a belt type CVT, and having a restricted length in an axial direction of a cylinder.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An off-road type motorcycle 1 according to an embodiment of the invention is now described with reference to the drawings. However, a motorcycle according to the invention is not limited to this embodiment and should be construed in a wide sense. That is, the motorcycle may be another type of motorcycle such as a scooter, a moped, and so on.

[Outline Construction of Motorcycle 1]

Figure 1:
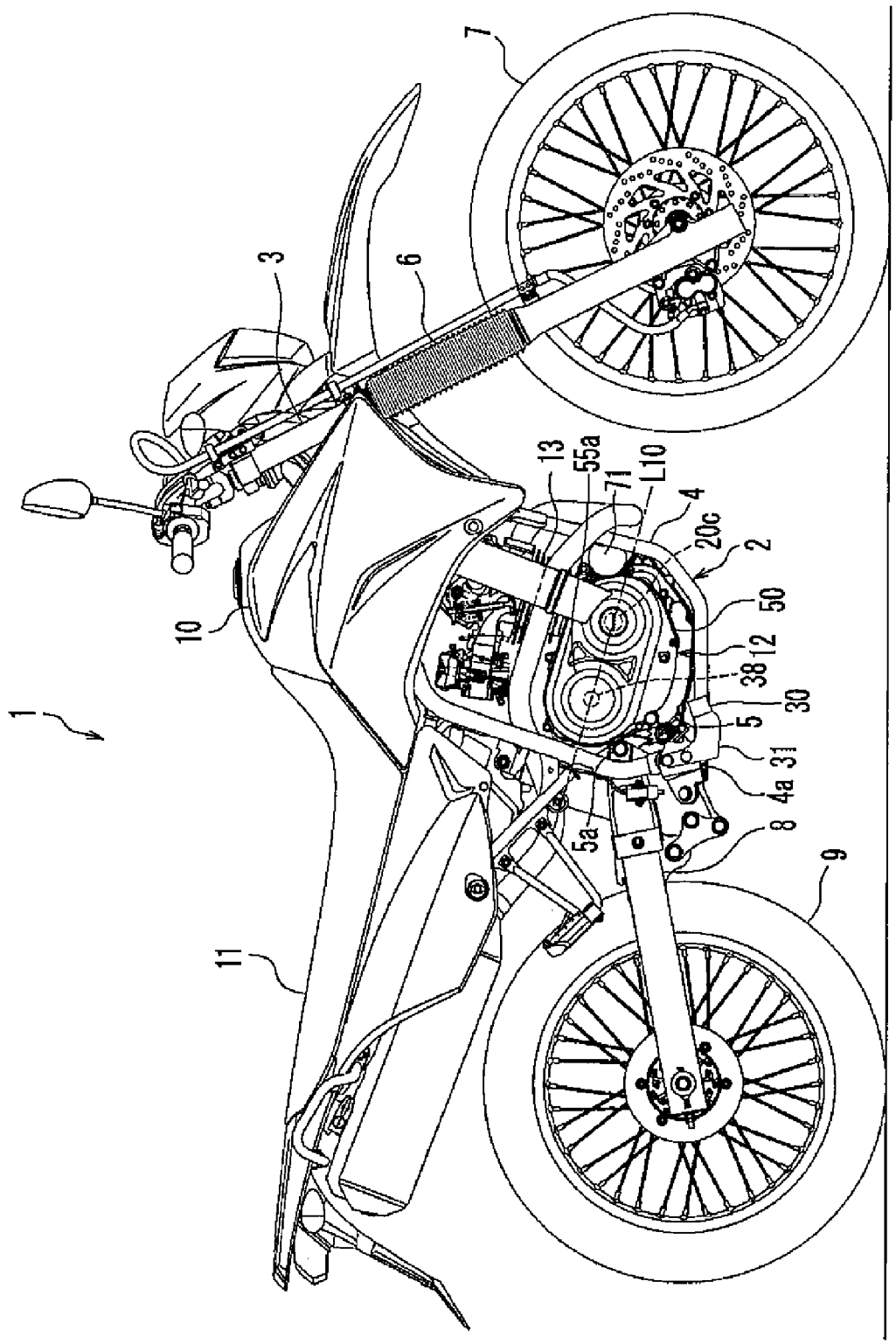
FIG. 1 is a side view of a motorcycle according to the invention.

FIG. 1 is a side view of motorcycle 1. In the following description, front and rear, and left and right directions are from the perspective of a rider seated on a seat 11.

Motorcycle 1 comprises a body frame 2. Body frame 2 comprises a steering head pipe 3, a vertically extending down frame 4 and a seat pillar 5. Down frame 4 extends downward from steering head pipe 3, bends midway, and extends substantially horizontally from a midway portion thereof. Seat pillar 5 extends above down frame 4 and rearward from steering head pipe 3. Tip ends of down frame 4 and seat pillar 5 are connected to each other. A support member 31 extends forward from a connection 4a of down frame 4 and seat pillar 5. Left and right foot steps 30 are mounted to a tip end of support member 31 and are positioned below a secondary sheave 37 as viewed in side view.

A lower end of steering head pipe 3 is connected to a front wheel 7 through a front fork 6. A rear arm 8 extending rearward is journaled in the vicinity of a lower end (portion just above connection 4a) of seat pillar 5. More specifically, a base end of rear arm 8 is journaled by a pivot shaft 5a connected to seat pillar 5. A rear wheel 9 serving as a drive wheel is mounted rotatably to a tip (rear) end of rear arm 8.

A cover 10 covers body frame 2. Seat 11 is mounted a little rearwardly of a center of cover 10.

Figure 2:
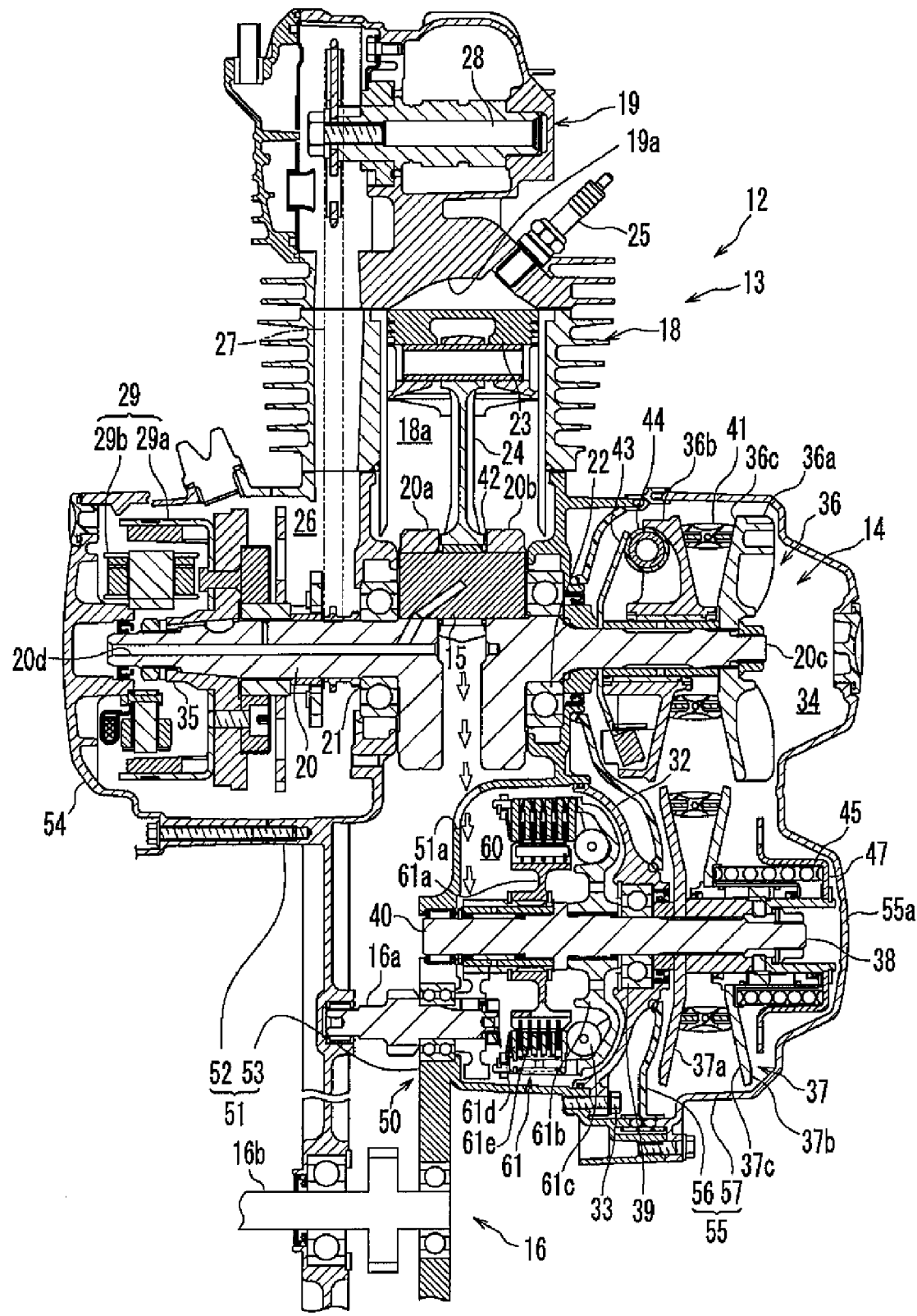
FIG. 2 is a cross sectional view of an engine unit of the motorcycle of FIG. 1.

An engine unit 12 is arranged between and mounted to down frame 4 and seat pillar 5. As shown in FIG. 2, engine unit 12 comprises a four-stroke engine 13, a belt type CVT 14, a centrifugal clutch 61, a generator 29 and a reduction mechanism 16. Driving force generated in engine unit 12 is transmitted to rear wheel 9 through a power transmission mechanism 80 such as a chain, belt, etc.

[Engine Unit 12]

The construction of engine unit 12 is now described primarily with reference to FIG. 2. Engine unit 12 comprises four-stroke engine 13, belt type CVT 14, centrifugal clutch 61, reduction mechanism 16 and generator 29. FIG. 2 omits a partial construction of reduction mechanism 16 for sake of explanation.

[Construction of Unit Case 50]

Engine unit 12 is accommodated in a unit case 50 that serves as an engine case. Unit case 50 comprises a crank case 51, a generator case 54 and a transmission case 55.

A crank shaft 20 is accommodated in crank case 51. Crank case 51 comprises a first case block 52 and a second case block 53 that abut in a vehicle width direction. First case block 52 is positioned on the left of a piston 23 and second case block 53 is positioned on the right of piston 23.

Transmission case 55 is mounted to a right side of second case block 53 and comprises an inner case 56 and an outer case 57. Inner case 56 is mounted to the right side of second case block 53. Outer case 57 is mounted to a right side of inner case 56. Outer case 57 and inner case 56 compartment and form a belt chamber 34.

Generator case 54 is mounted detachably to a left side of a front half of first case block 52. Generator case 54 and first case block 52 compartment and form a generator chamber, in which generator 29 is accommodated. Generator case 54 is arranged in opposition to a primary sheave 36 in the vehicle width direction.

(Four-stroke Engine 13)

Four-stroke engine 13 comprises a crank shaft 20 extending horizontally in the vehicle width direction, a cylinder body 18, which forms a substantially cylindrical-shaped cylinder 18a and a cylinder head 19. Crank shaft 20 is accommodated in crank case 51 and is supported on first case block 52 and second case block 53 with bearings 21, 22 therebetween.

Figure 3:
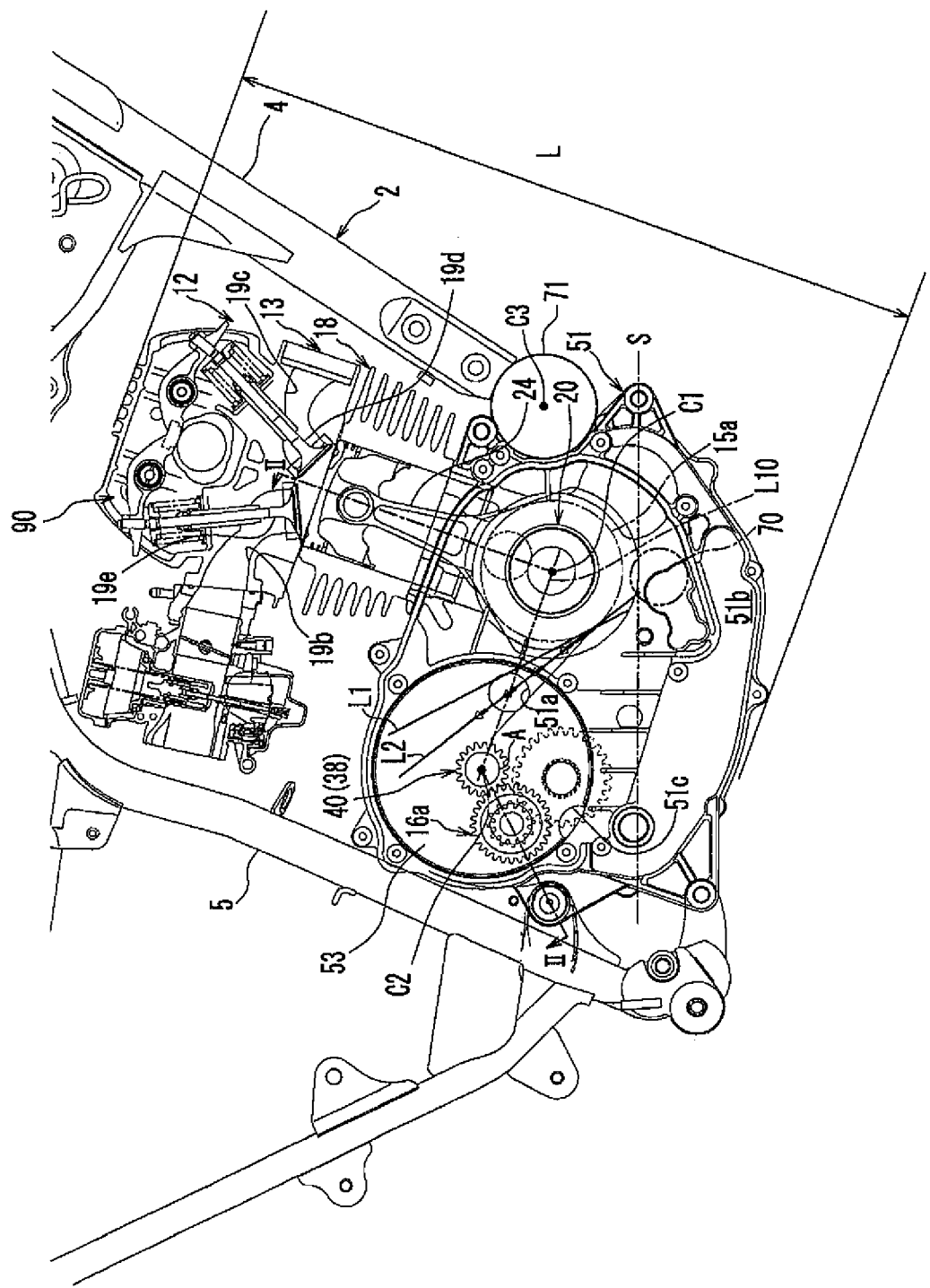
FIG. 3 is a side view of an engine unit according to the invention.

Cylinder 18a is connected forwardly and upwardly obliquely to crank case 51 (see FIGS. 1 and 3). Cylinder 18a is arranged rearwardly of down frame 4 with an axis thereof extending vertically. Cylinder head 19 is connected to a tip end of cylinder body 18. Piston 23 is inserted slidably into cylinder 18a. One end of a connecting rod 24 is connected to a side of piston 23 toward crank shaft 20. The other end of connecting rod 24 is connected to crank shaft 20 by a crank pin 15 arranged between a left crank arm 20a and a right crank arm 20b of crank shaft 20. Thereby, piston 23 reciprocates in cylinder 18a upon rotation of crank shaft 20.

A recess 19a communicated to cylinder 18a, and an intake port 19b and an exhaust port 19c communicated to recess 19a, are formed in cylinder head 19. An intake valve 19d is arranged in intake port 19b and an exhaust valve 19e is arranged in exhaust port 19c.

A cam chain chamber 26 is formed on the left in cylinder body 18 to provide communication between an interior of crank case 51 and an interior of cylinder head 19. A cam chain 27 is arranged in cam chain chamber 26 and is wound round crank shaft 20 and a cam shaft 28. Cam shaft 28 constitutes a part of a valve operating mechanism 90. Intake valve 19d is driven by valve operating mechanism 90 including cam shaft 28 to open and close intake port 19b. Valve operating mechanism 90 also drives exhaust valve 19e to open and close exhaust port 19c. Intake port 19b and exhaust port 19c are opened and closed to intake and exhaust to and from cylinder 18a.

An ignition plug 25 is mounted to cylinder head 19. An ignition part positioned at a tip end of ignition plug 25 is exposed into recess 19a.

A recess, which constitutes a clutch chamber 60, is formed on the right of a rear half of second case block 53. A clutch cover 32 is mounted airtightly to the recess and is fixed detachably to second case block 53 by a bolt 33. As shown in FIG. 3, an oil supply hole 51a opened to clutch chamber 60 and an oil discharge hole 51c are formed on second case block 53. Therefore, a space in crank case 51 and clutch chamber 60 are communicated to each other.

A left end of crank shaft 20 extends through first case block 52 to reach an interior of generator case 54. Generator 29 is mounted to the left end of crank shaft 20 and comprises a rotor 29a and a stator 29b. Rotor 29a is cylindrical in shape. Stator 29b is arranged in rotor 29a and is fixed to generator case 54 not to enable rotation and displacement. On the other hand, rotor 29a is fixed to a sleeve 35, which rotates together with crank shaft 20. Thereby, as crank shaft 20 rotates, rotor 29a rotates relative to stator 29b to generate electric power.

(Starter Motor 71 and Balancer 72)

Figure 5:
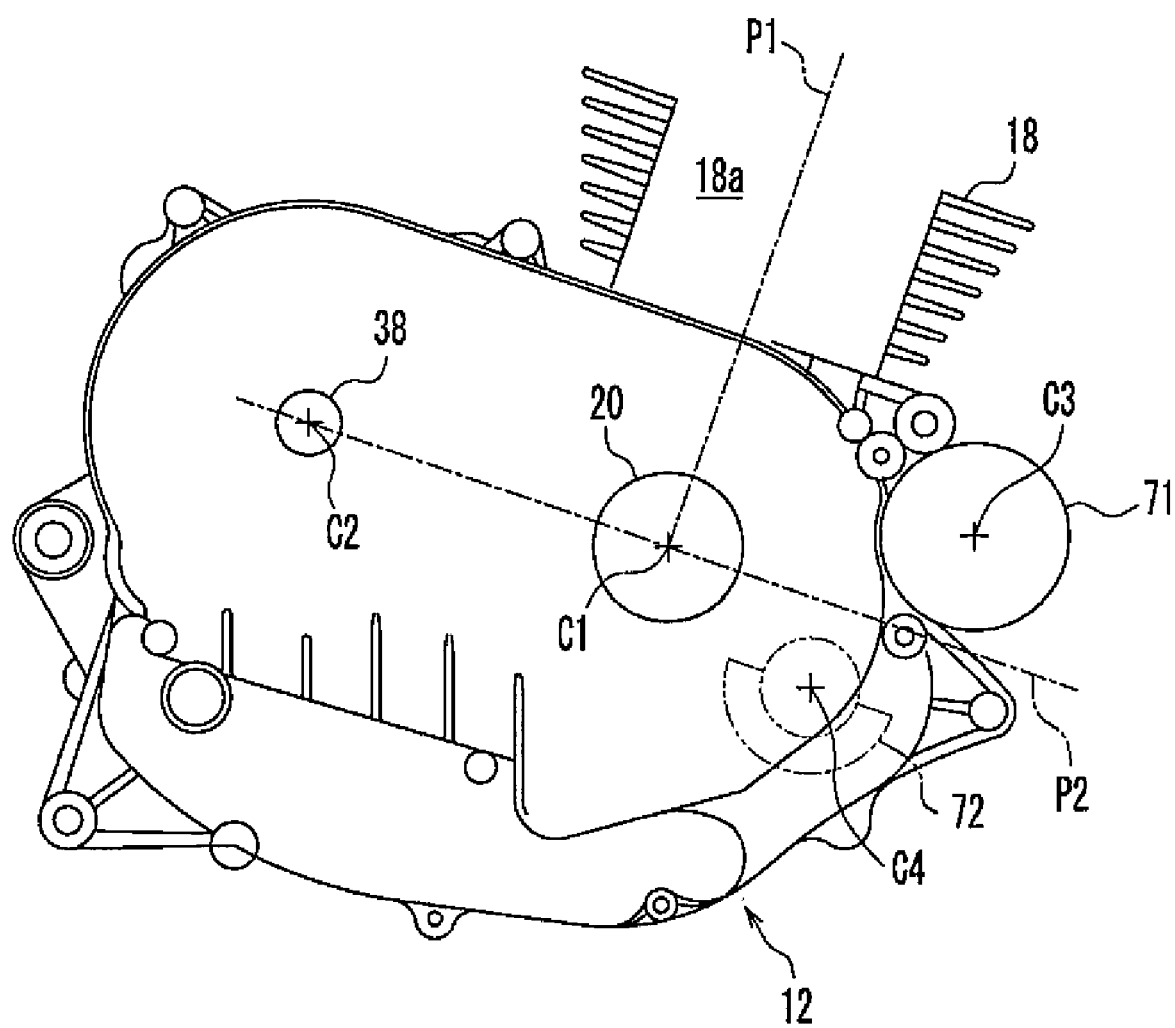
FIG. 5 is a schematic side view illustrating a positional relationship among an axis of a crank shaft, an axis of a secondary sheave shaft, an axis of a starter motor, and an axis of a balancer according to the invention.

As shown in FIG. 1, motorcycle 1 is provided with a starter motor 71 that rotates crank shaft 20 to start up engine 13. As shown in FIG. 5, an axis C3 of starter motor 71 is positioned forwardly of an imaginary plane P1 that includes an axis of cylinder 18a and an axis C1 of crank shaft 20 as viewed in side view. Further, a rear end of starter motor 71 is positioned forwardly of imaginary plane P1.

Also, as shown in FIG. 5, motorcycle 1 is provided with a balancer 72. Balancer 72 serves to decrease a weight deviation in a direction of rotation about axis C1 of crank shaft 20 to make rotation of crank shaft 20 smooth. Balancer 72 is connected to crank shaft 20 through a gear (not shown) and rotates as crank shaft 20 rotates. An axis C3 of balancer 72 is different from axis C1 of crank shaft 20. An axis C4 of balancer 72 is positioned forwardly of imaginary plane P1 as viewed in side view. Further, a rear end of balancer 72 is positioned forwardly of imaginary plane P1.

A further imaginary plane P2 including axis C1 of crank shaft 20 and an axis C2 of secondary sheave shaft 38 passes between axis C3 of starter motor 71 and axis C4 of balancer 72. In other words, in a vertical direction, axis C3 of starter motor 71 is positioned above imaginary plane P2 while axis C4 of balancer 72 is positioned below imaginary plane P2.

(Belt Type CVT 14)

Belt type CVT 14 is accommodated in belt chamber 34 and comprises primary sheave 36 and secondary sheave 37. Secondary sheave 37 is arranged rearwardly of and is larger in diameter than primary sheave 36.

Crank shaft 20 extends through second case block 53 and inner case 56 to extend to belt chamber 34. A right portion (a portion on the right of bearing 22) of crank shaft 20, which reaches belt chamber 34, constitutes a primary sheave shaft 20c. Primary sheave 36 is mounted to and rotates with primary sheave shaft 20c. Provided that primary sheave 36 rotates with primary sheave shaft 20c, it is not required that primary sheave 36 be mounted directly to primary sheave shaft 20c.

Primary sheave 36 comprises a primary stationary sheave body 36a, a primary moving sheave body 36b, a roller weight 44 and a cam plate 43. Primary stationary sheave body 36a fixed to a right tip end of primary sheave shaft 20c. Primary moving sheave body 36b is mounted to primary sheave shaft 20c on the left of primary stationary sheave body 36a. Primary moving sheave body 36b is axially movable relative to primary sheave shaft 20c. Primary stationary sheave body 36a and primary moving sheave body 36b constitute a belt groove 36c that is variable in width.

Cam plate 43 is arranged further on the left of primary moving sheave body 36b. Cam plate 43 is fixed to primary sheave shaft 20c. A spacing between primary moving sheave body 36b and cam plate 43 decreases in a radially outward direction. Roller weight 44 is arranged between primary moving sheave body 36b and cam plate 43 to enable displacement radially inward and outward.

Secondary sheave shaft 38 is arranged rearwardly of primary sheave shaft 20c on a rear half of transmission case 55. As shown in FIG. 3, an axis of crank shaft 20 is positioned below an axis of secondary sheave shaft 38.

Secondary sheave shaft 38 extends through inner case 56 and clutch cover 32 and into clutch chamber 60. Secondary sheave shaft 38 is mounted to clutch cover 32 with a bearing 39 therebetween. Secondary sheave 37 is mounted to and rotates with secondary sheave shaft 38 within belt chamber 34. Provided that secondary sheave 37 rotates with secondary sheave shaft 38, it need not be mounted directly to secondary sheave shaft 38.

Secondary sheave 37 comprises a secondary stationary sheave body 37a and a secondary moving sheave body 37b. Secondary stationary sheave body 37a is fixed to secondary sheave shaft 38 in belt chamber 34. Secondary moving sheave body 37b is mounted to secondary sheave shaft 38 on the right of secondary stationary sheave body 37a. Secondary moving sheave body 37b is axially movable relative to secondary sheave shaft 38. Secondary stationary sheave body 37a and secondary moving sheave body 37b constitute a belt groove 37c that is variable in width.

A substantially cylindrical-shaped spring catch 47 is fixed to a right tip end of secondary sheave shaft 38. A compression coil spring 45 is arranged between spring catch 47 and secondary moving sheave body 37b. The bias of spring 45 biases secondary moving sheave body 37b leftward, that is, toward secondary stationary sheave body 37a.

An endless belt 41 having a substantially trapezoidal-shaped cross section is wound round belt groove 37c of secondary sheave 37 and belt groove 36c of primary sheave 36. Therefore, when primary sheave 36 rotates together with crank shaft 20, torque thereof is transmitted to secondary sheave 37 through endless belt 41. Consequently, secondary sheave shaft 38 also rotates together with secondary sheave 37. Belt 41 may comprise, for example, a resin block belt.

As shown in FIG. 1, a center of secondary sheave shaft 38 of secondary sheave 37 is higher than a center of primary sheave shaft 20c of primary sheave 36. That is, CVT 14 extends rearward and upward. Pivot shaft 5a, to which the tip end of rear arm 8 is mounted, is lower than the center of secondary sheave 37.

Secondary sheave shaft 38 is connected to an output shaft 16b through centrifugal clutch 61. Specifically, a portion of secondary sheave shaft 38 positioned in clutch chamber 60 on the left of clutch cover 32 constitutes a clutch shaft 40. Centrifugal clutch 61 is mounted to clutch shaft 40, and reduction mechanism 16 is connected to centrifugal clutch 61. Centrifugal clutch 61 provides a connection or a disconnection between secondary sheave shaft 38 and reduction mechanism 16 according to the rotating speed of secondary sheave shaft 38 (clutch shaft 40).

Centrifugal clutch 61 comprises a clutch boss 61a connected to reduction mechanism 16, a substantially cylindrical-shaped clutch housing 61b and a roller weight 61c that enables displacement radially inward and outward. Clutch housing 61b is fixed to and rotates with clutch shaft 40 (secondary sheave shaft 38). Clutch housing 61b comprises a plurality of clutch plates 61d arranged at substantially equal intervals relative to one another. The mutually adjacent clutch plates 61d are variable in interval.

Clutch boss 61a is arranged in clutch housing 61b and is rotatable relative to clutch shaft 40. Clutch boss 61a comprises a plurality of friction plates 61e arranged at substantially equal intervals relative to one another. The mutually adjacent friction plates 61a are variable in interval.

When secondary sheave shaft 38 has a low rotating speed, clutch plates 61d and friction plates 61e separate from each other. Clutch housing 61b and clutch boss 61a are not connected to each other, and the torque of secondary sheave shaft 38 is therefore not transmitted to reduction mechanism 16.

On the other hand, when secondary sheave shaft 38 has a high rotating speed, roller weight 61c is displaced radially outward. Thereby, a distance between adjacent friction plates 61e decreases. Clutch plates 61d and friction plates 61e are put in a state of pressure contact. Consequently, clutch housing 61b and clutch boss 61a are put in a connected state, so that the torque of secondary sheave shaft 38 is transmitted to reduction mechanism 16. Clutch boss 61a and a reduction shaft 16a of reduction mechanism 16 mesh with each other and rotate together. Torque transmitted to reduction shaft 16a is output from an output shaft of reduction mechanism 16 to be transmitted to rear wheel 9.

According to the embodiment, reduction shaft 16a of reduction mechanism 16 is arranged in a position more distant from crank shaft 20 than from clutch shaft 40, that is, rearward as shown in FIGS. 2 and 3. In other words, clutch shaft 40, to which wet type centrifugal clutch 61 is mounted, is closer to crank shaft 20 than is reduction shaft 16a. A construction is therefore provided in which no rotating shaft to prevent oil supply to clutch shaft 40 is arranged between crank shaft 20 and clutch shaft 40.

[Supply of Lubricating Oil to Clutch Shaft 40 and Centrifugal Clutch 61]

Supply of lubricating oil to clutch shaft 40 is now described with reference to FIGS. 2 and 3. As shown in FIG. 3, an oil reservoir portion 51b is provided on a bottom of crank case 51 to store lubricating oil. Oil reservoir portion 51b extends rearwardly of a front end of secondary sheave 37 from forwardly of a front end of primary sheave 36. More specifically, a rear end of oil reservoir portion 51b is rearward of an axis of secondary sheave shaft 38. Oil reservoir portion 51b is formed generally below primary sheave 36 and secondary sheave 37.

Lubricating oil stored in oil reservoir portion 51b is supplied to a connection 42 of crank shaft 20 and connecting rod 24 by an oil pump 70, which is arranged as a lubricating oil supply mechanism on oil reservoir portion 51b in crank case 51. Lubricating oil drawn by oil pump 70 is guided to one or a plurality of oil supply passages 20d, which are substantially circular in shape in plan view and opened to a left end surface of crank shaft 20, to be supplied to connection 42.

Lubricating oil supplied to connection 42 scatters from connection 42 as crank shaft 20 rotates. An oil supply hole 51a is formed on second case block 53 to guide lubricating oil that scatters as crank shaft 20 rotates into clutch chamber 60 to be supplied to clutch shaft 40. Specifically, as shown in FIG. 3, oil supply hole 51a is formed on second case block 53 so that a tangent line L1 tangent to both a circular track 15a of crank pin 15 and an outer ring of oil supply hole 51a is positioned above a lower end A of a body of clutch shaft 40 in side view. More specifically, tangent line L1 is tangent to a lower portion of circular track 15a of crank pin 15 and an upper portion of oil supply hole 51a and passes between oil supply hole 51a and circular track 15a to extend rearward and obliquely upward. At least a portion of oil supply hole 51a is formed on second case block 53 above a straight line L10 that passes through axis C1 of crank shaft 20 and axis C2 of clutch shaft 40. Crank shaft 20 and clutch shaft 40 are arranged so that portions thereof face each other with oil supply hole 51a therebetween.

Lubricating oil introduced into clutch chamber 60 from oil supply hole 51a is supplied to clutch shaft 40 and thereafter returns again to oil reservoir portion 51b from oil discharge hole 51c provided downwardly and slightly rearwardly of second case block 53.

Oil discharge hole 51c is positioned above a lowermost point of circular track 15a of connection 42 in a vertical direction in side view. Further, oil discharge hole 51c is positioned in the same position as or above crank shaft 20 in the vertical direction in side view.

<<Operation and Effect>>

(Axial Length of Cylinder 18a of Engine Unit 12)

As described above, engine unit 12 according to the embodiment comprises secondary sheave 37 arranged rearwardly of primary sheave 36. Therefore, engine unit 12 is larger in longitudinal length than an ordinary engine unit of a so-called manual transmission type. In view of this feature, oil reservoir portion 51b is lengthy in a longitudinal direction and extends rearward from the front end of secondary sheave 37 as shown in FIG. 3. In this manner, oil reservoir portion 51b normally arranged below crank shaft 20 is formed to be lengthy in the longitudinal direction whereby it is possible to ensure a volume for oil reservoir portion 51b and to shorten a length of oil reservoir portion 51b in the axial direction of cylinder 18a. Thereby, a length L of engine unit 12 in the axial direction of cylinder 18a is restricted.

Also, according to the embodiment, since an axis of cylinder 18a extends vertically, a length of engine unit 12 in the longitudinal direction is also restricted.

With belt type CVT 14, secondary sheave 37 is larger in diameter than primary sheave 36. Therefore, when axis C1 of crank shaft 20 provided with primary sheave 36 and axis C2 of secondary sheave shaft 38 provided with secondary sheave 37 are arranged to be made horizontal, a lower end of secondary sheave 37 is positioned below a lower end of primary sheave 36. Consequently, the length L of engine unit 12 in the axial direction of cylinder 18a is lengthened.

In contrast, according to the embodiment, axis C1 of crank shaft 20 is below axis C2 of secondary sheave shaft 38. In other words, axis C2 of secondary sheave shaft 38 is above axis C1 of crank shaft 20. Therefore, the length L of engine unit 12 in the axial direction of cylinder 18a is shortened. Axis C2 of secondary sheave shaft 38 is preferably positioned in substantially the same position as that of axis C1 of crank shaft 20, or above axis C1 of crank shaft 20 in the axial direction of cylinder 18a. The length L of engine unit 12 in the axial direction of cylinder 18a is thereby further effectively decreased.

Also, the embodiment is large in low-speed torque and high in convenience since the four-stroke engine 13 is adopted.

In addition, for example, in the case where axis C3 of starter motor 71 is positioned rearwardly of imaginary plane P1 and axis C4 of balancer 72 is positioned rearwardly of imaginary plane P1, starter motor 71, balancer 72, and secondary sheave 37 interfere with one another, so that it is difficult to make axis C1 of crank shaft 20 lower than axis C2 of secondary sheave shaft 38.

In contrast, according to the embodiment, as shown in FIG. 5, starter motor 71 is arranged so that its axis C3 is positioned forwardly of imaginary plane P1 in side view. Also, balancer 72 is arranged so that its axis C4 is positioned forwardly of imaginary plane P1 in side view. Therefore, starter motor 71, balancer 72, and secondary sheave 37 are inhibited from interfering with one another. Accordingly, it is possible to readily make axis C1 of crank shaft 20 lower than axis C2 of secondary sheave shaft 38.

Also, since starter motor 71 and balancer 72 are not present on the axis of cylinder 18a, the length of engine unit 12 in the axial direction of cylinder 18a is relatively decreased.

Also, for example, in the case where both starter motor 71 and balancer 72 are positioned above imaginary plane P2 and in the case where both starter motor 71 and balancer 72 are positioned below imaginary plane P2, starter motor 71 and balancer 72 are aligned in a direction in which primary sheave 36 and secondary sheave 37 are arranged. Therefore, a length of engine unit 12 in a direction in which primary sheave 36 and secondary sheave 37 are arranged is relatively increased. Consequently, the length of engine unit 12 in the longitudinal direction becomes relatively large.

In contrast, according to the embodiment, in the vertical direction, axis C3 of starter motor 71 is positioned above imaginary plane P2 while axis C4 of balancer 72 is positioned below imaginary plane P2. Therefore, starter motor 71 and balancer 72 are not aligned in that direction in which primary sheave 36 and secondary sheave 37 are arranged. Therefore, a length of engine unit 12 in that direction in which primary sheave 36 and secondary sheave 37 are arranged can be relatively decreased. Consequently, the length of engine unit 12 in the longitudinal direction becomes relatively small.

(Supply of Lubricating Oil)

According to the embodiment, as shown in FIGS. 2 and 3, oil supply hole 51a and oil discharge hole 51c are formed on second case block 53. Therefore, clutch chamber 60 is communicated to an interior of crank case 51. Accordingly, when engine unit 12 vibrates or fluctuates to cause lubricating oil in oil reservoir portion 51b to splash, or to cause the oil level to fluctuate, there is a fear that a large quantity of lubricating oil may flow into clutch chamber 60 through oil supply hole 51a and discharge hole 51c. Consequently, there is a fear that a surplus quantity of lubricating oil will be supplied to centrifugal clutch 61. When a surplus quantity of lubricating oil is supplied to centrifugal clutch 61, there is a problem in that a loss in energy transmission is generated in centrifugal clutch 61 by viscous resistance of the lubricating oil. Also, there is a problem in that centrifugal clutch 61 decreases in rotating speed. Further, there is a problem in that the lubricating oil is increased in temperature and degraded in lubrication.

As described above, however, according to the embodiment, axis C2 of secondary sheave shaft 38 is positioned above axis C1 of crank shaft 20 in side view. That is, belt type CVT 14 extends rearward and upward. In other words, as shown in FIGS. 1 and 3, straight line L10 passing through the center of primary sheave shaft 20c and the center of secondary sheave shaft 38 rises rearward in plan view. Therefore, as shown in FIG. 3, secondary sheave shaft 38, to which centrifugal clutch 61 is mounted, is positioned in a relatively higher position than oil level S of lubricating oil in oil reservoir portion 51b. Oil supply hole 51a and oil discharge hole 51c are also formed in relatively higher positions than oil level S.

Therefore, even when engine unit 12 vibrates or fluctuates to cause lubricating oil in oil reservoir portion 51b to splash or the oil level to fluctuate, lubricating oil is inhibited from entering clutch chamber 60 from oil discharge hole 51c and from being supplied excessively to centrifugal clutch 61. Therefore, loss in energy transmission in centrifugal clutch 61 is suppressed and centrifugal clutch 61 is inhibited from being decreased in rotating speed. Further, the lubricating oil is inhibited from being increased in temperature or decreased in lubrication. This construction is especially effective in a saddle-type vehicle that runs on irregular land such as dirt courses, etc., such as the off-road type motorcycle according to the embodiment.

From the viewpoint of especially effectively suppressing entrance of lubricating oil into clutch chamber 60 from oil discharge hole 51c, oil discharge hole 51c is preferably positioned above the lowermost point of circular track 15a of connection 42 in the vertical direction in side view. Further, oil discharge hole 51c is preferably positioned in the same position as or above crank shaft 20 in the vertical direction in side view.

In this manner, according to the embodiment, while lubricating oil is effectively inhibited from being supplied excessively to centrifugal clutch 61, lubricating oil required for centrifugal clutch 61 is efficiently supplied as needed. In particular, since lubricating oil is supplied to centrifugal clutch 61 as crank shaft 20 rotates, crank shaft 20 and clutch shaft 40 are high in rotating speed per unit time, and when a relatively large quantity of lubricating oil becomes necessary, a further large quantity of lubricating oil is supplied to centrifugal clutch 61, so that seizure of centrifugal clutch 61 is surely suppressed.

Figure 4:
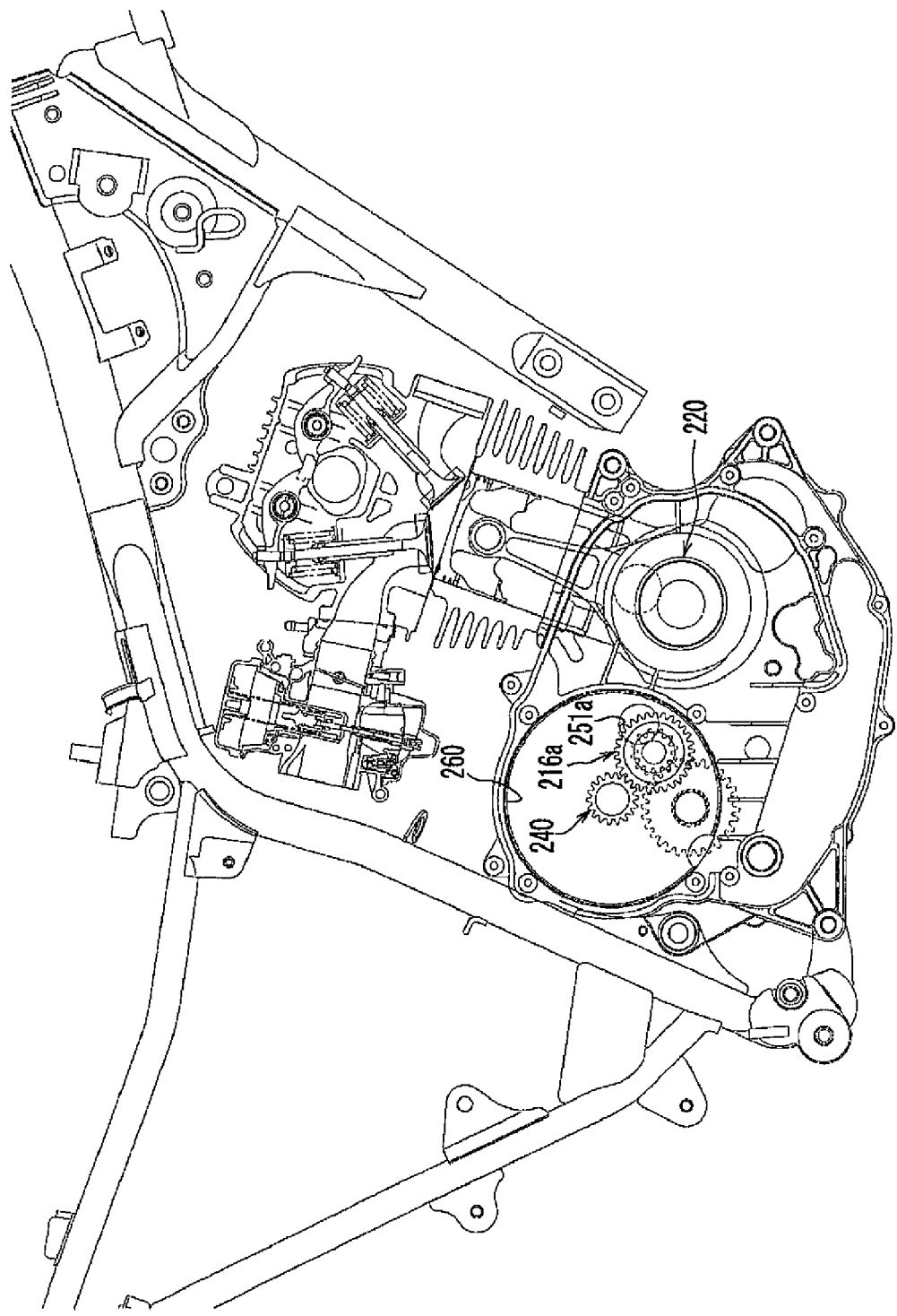
FIG. 4 is a side view of an engine unit having a transmission shaft arranged closer to a crank shaft than a clutch shaft is.

For example, with the construction shown in FIG. 4, a reduction shaft 216a inhibits a lubricating oil introduced into a clutch chamber 260 from being supplied to a clutch shaft 240. Specifically, as shown in FIG. 4, since reduction shaft 216a is closer to a crank shaft 220 than is clutch shaft 240, a major part of lubricating oil introduced into clutch chamber 260 from an oil supply hole 251a strikes against reduction shaft 216a. With the construction shown in FIG. 4, a part of the lubricating oil striking against reduction shaft 216a to scatter is only supplied to clutch shaft 240 and so it is difficult to efficiently supply lubricating oil to clutch shaft 240.

In contrast, according to the invention, reduction (transmission) shaft 16a is arranged rearwardly of clutch shaft 40, as shown in FIGS. 2 and 3. That is, clutch shaft 40 is closer to crank shaft 20 than is reduction shaft 16a. Accordingly, lubricating oil supplied from connection 42 is efficiently supplied to clutch shaft 40 and centrifugal clutch 61 without being obstructed by reduction shaft 16a. In particular, a construction is realized in which no rotating shaft is existent between crank shaft 20 and clutch shaft 40, which is preferable from the viewpoint of efficient supply of lubricating oil to clutch shaft 40 and centrifugal clutch 61.

As described above, according to the embodiment, since efficient supply of lubricating oil to centrifugal clutch 61 is realized, seizure of centrifugal clutch 61 is effectively suppressed. Also, oil supply hole 51a can be made relatively small in size. Further, since a considerably large oil supply capacity per unit time is not demanded of oil pump 70, it is possible to make oil pump 70 and hence engine unit 12 small in size and light in weight.

(Kinematical Performance of Motorcycle 1)

Also, by arranging engine unit 12 so that a center of secondary sheave shaft 38 of secondary sheave 37 is above a center of primary sheave shaft 20c of primary sheave 36, a length of engine unit 12 in the longitudinal direction can be shortened. Therefore, seat pillar 5 and pivot shaft 5a can be arranged further forward, so that rear arm 8 can be lengthened. Motorcycle 1 is thereby improved in kinematical performance.

To further improve motorcycle 1 in kinematical performance, pivot shaft 5a is preferably positioned below the center of secondary sheave 37 in side view. This is because unit case 50 and pivot shaft 5a can be inhibited from interfering with each other, so that pivot shaft 5a can be arranged further forward.

(Other Modifications)

While an example has been described in which in the vertical direction, axis C3 of starter motor 71 is above imaginary plane P2 while axis C4 of balancer 72 is below imaginary plane P2, the invention is not limited to this. Axis C3 of starter motor 71 may be below imaginary plane P2 while axis C4 of balancer 72 may be above imaginary plane P2.

(Definition in the Specification of the Present Application)

The wording "extending vertically" is not limited only to extending vertically in a strict meaning and includes the case of extending obliquely at an angle of ±45 degrees or less to a vertical direction.

The invention is useful for a saddle-type vehicle provided with a belt type continuously variable transmission. In particular, the invention is useful for a saddle-type vehicle provided with a belt type continuously variable transmission and having a relatively large displacement.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
   an engine unit having an output shaft;
   a drive wheel;
   a power transmission mechanism that transmits motive power to the drive wheel from the output shaft; and
   a body frame having a down frame extending vertically, wherein
   the engine unit comprises:
      a four-stroke engine including a cylinder body that forms a cylinder arranged rearwardly of the down frame with an axis thereof extending vertically, and a crank shaft arranged below the cylinder;
      a continuously variable transmission including a primary sheave provided on the crank shaft, a secondary sheave shaft arranged rearwardly of the crank shaft to be connected to the output shaft, a secondary sheave provided on the secondary sheave shaft, and an endless belt wound round the primary sheave and the secondary sheave;
      a clutch provided between the secondary sheave shaft and the output shaft; and
      an engine case that supports the crank shaft, the secondary sheave shaft, and the output shaft and in which an oil reservoir portion is formed below the crank shaft to store a lubricating oil, wherein
      a rear end portion of the oil reservoir portion is rearward of a front end of the secondary sheave, and
      an axis of the crank shaft is below an axis of the secondary sheave shaft.

2. The motorcycle according to claim 1, wherein the engine unit further comprises:

a starter motor for rotation of the crank shaft; and a balancer having a different axis from the axis of the crank shaft and rotating with the crank shaft, wherein the axis of the balancer and an axis of the starter motor are forward of an imaginary plane including the axis of the cylinder and the axis of the crank shaft in side view.

3. The motorcycle according to claim 2, wherein in a vertical direction, the axis of the balancer is positioned on one side of a further imaginary plane including the axis of the crank shaft and an axis of the secondary sheave shaft while the axis of the starter motor is positioned on the other side of the further imaginary plane.

4. The motorcycle according to claim 1, wherein the rear end portion of the oil reservoir portion is rearward of an axis of the secondary sheave shaft.

5. The motorcycle according to claim 1, further comprising a clutch chamber housing the clutch and including an oil supply hole, wherein the oil supply hole is arranged to deliver the lubricating oil scattered by the crank shaft to the clutch housed in the clutch chamber.

* * * * *